Figure 1:
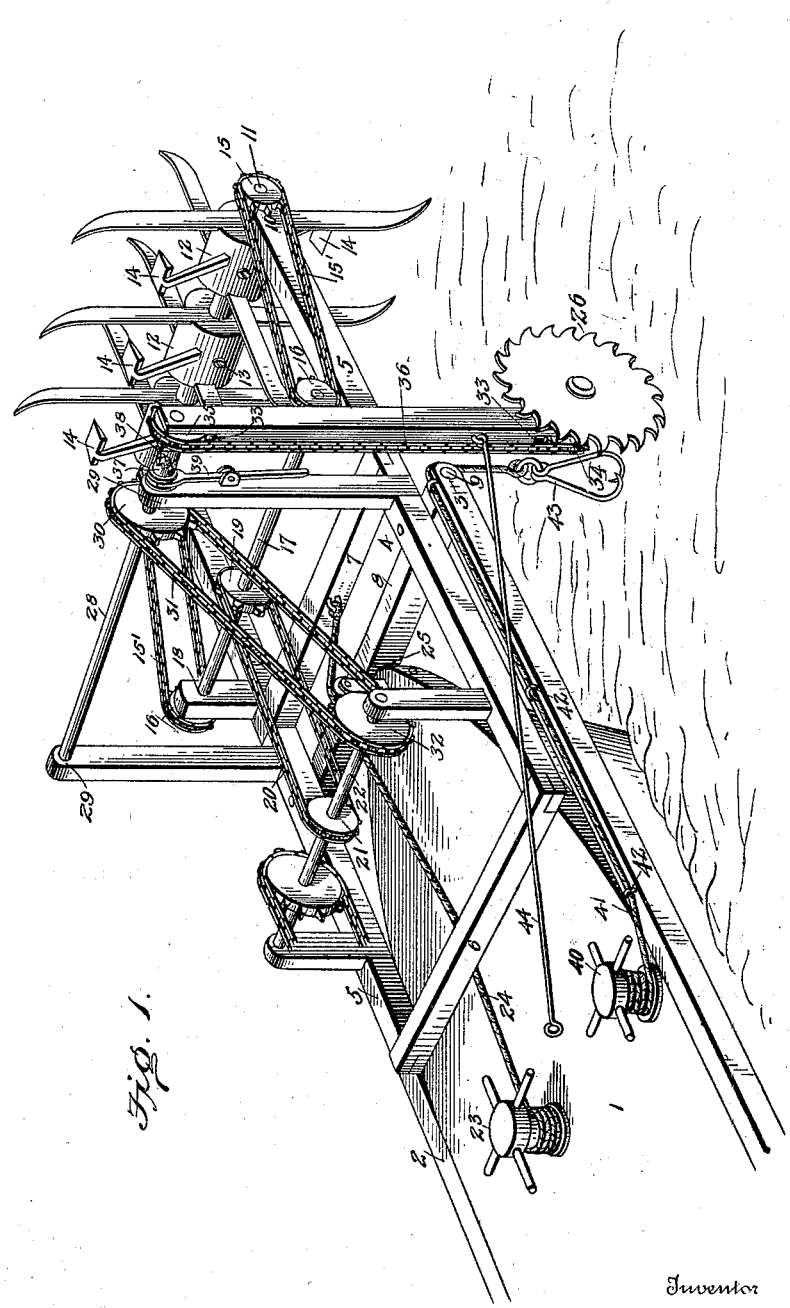

No. 644,885. Patented Mar. 6, 1900.
J. ALLEN.
MACHINE FOR CUTTING GRASS, &c., FROM RIVER BOTTOMS.
(Application filed June 1, 1899.)
(No Model.) 2 Sheets—Sheet 1.

Witnesses Inventor
Joseph Allen
by H. B. Willson & Co.
Attorneys

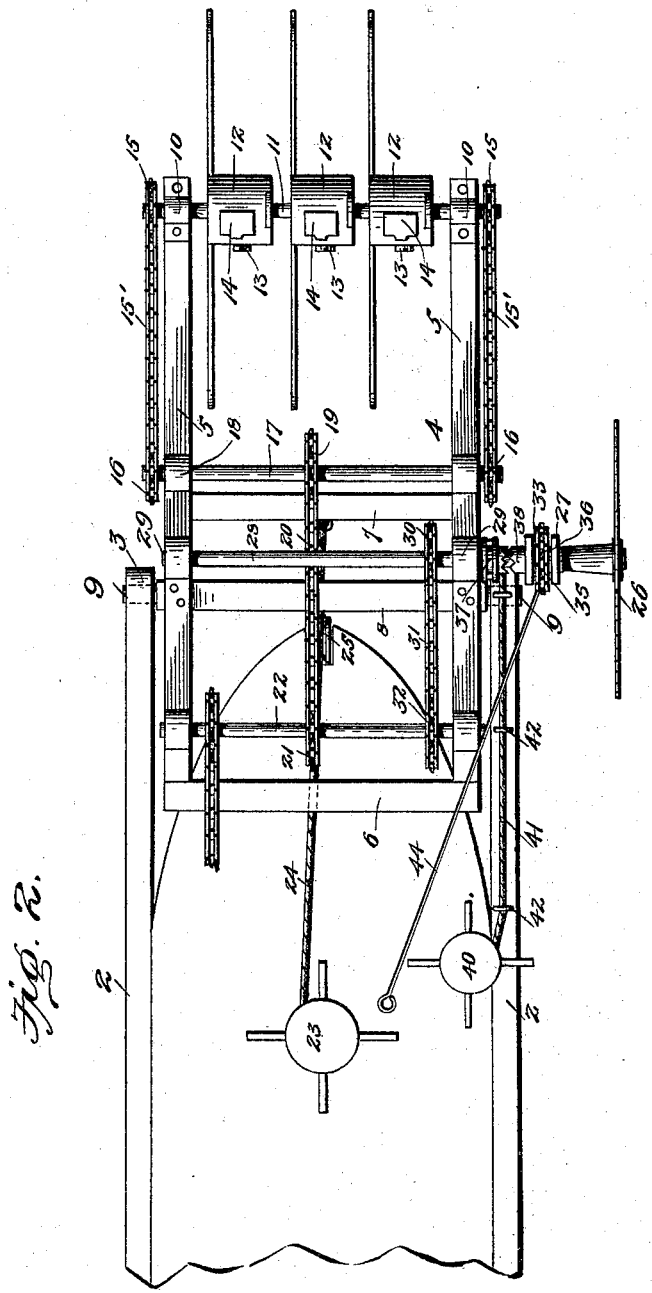

UNITED STATES PATENT OFFICE.

JOSEPH ALLEN, OF CHIPCO, FLORIDA.

MACHINE FOR CUTTING GRASS, &c., FROM RIVER-BOTTOMS.

SPECIFICATION forming part of Letters Patent No. 644,885, dated March 6, 1900.

Application filed June 1, 1899. Serial No. 719,016. (No model.)

*To all whom it may concern:*

Be it known that I, JOSEPH ALLEN, a citizen of the United States, residing at Chipco, in the county of Pasco and State of Florida, have invented certain new and useful Improvements in Machines for Cutting Grass and other Vegetation from River-Bottoms; and I do declare the following to be a full, clear, and exact description of the invention, such as will enable others skilled in the art to which it appertains to make and use the same.

The invention has relation to machines for cutting grass and other vegetation from the bottoms of rivers, which seriously interferes with traffic on many of the southern rivers.

A further object is to provide means for cutting away partially submerged and embedded logs, so as to lessen the danger of collision of vessels with these obstructions.

With these objects in view the invention consists in certain features of construction and combination of parts, which will be hereinafter fully described and particularly pointed out in the appended claim.

In the accompanying drawings, Figure 1 is a perspective view of a portion of the bow of a vessel equipped with my improved machine. Fig. 2 is a top plan view.

In the drawings, 1 denotes the bow of a boat, and 2 denotes two longitudinal beams secured to the bow and extending forwardly in advance of the same and provided at their free ends with bearings 3.

4 denotes the cutter-frame, consisting of the longitudinal side pieces 5 5, the rear cross-piece 6, and the intermediate cross-piece 7.

8 denotes a cross-piece having journals 9 at its ends, which fit in the bearings of the side pieces 2 and permit of a swinging movement of the said cutter-frame.

Journaled in bearings 10 at the forward end of the cutter-frame is a shaft 11, provided with cutter-heads 12, which are fixed to said shaft by set-screws 13. Each cutter-head is provided with long sharp cutting-blades, which alternate with chopping-blades 14. The forward end of this cutter-frame is adapted to be lowered into the water and to cut and chop seaweed, grasses, and all forms of vegetation that grow in rivers and which are very often of such density as to impede if not entirely stop navigation.

The cutting mechanism is driven by mechanism which I will now proceed to describe. At each end of the cutter-shaft are provided sprocket-wheels 15, which are connected by sprocket-chains 15' with sprocket-wheels 16, fixed to a shaft 17, journaled in bearings 18, secured to the side pieces of the frame. Secured to the shaft 17 is a sprocket-wheel 19, which is connected by a sprocket-chain 20 to a sprocket-wheel 21 on the drive-shaft 22, which shaft 22 is driven by any suitable power carried by the vessel to which the machine is attached. The rotary movement of the drive-shaft is transmitted to the cutting mechanism, and as the vessel is propelled forward this cutting mechanism is rapidly rotated, cutting and chopping away all the weeds and grass with which the blades and choppers come in contact and making a clear passage for the vessel.

In order to adjust the cutting mechanism to different depths, I provide a windlass 23, which has a cable 24, that runs over a pulley 25, secured to the bow of the vessel, and is connected with the intermediate cross-piece of the frame. By rotating this windlass it will be seen that the forward end of the cutter-frame may be raised or lowered when desired.

Oftentimes it is found necessary to remove logs that have become submerged in the water and embedded in the bottom of the river, and also in narrow streams it is often necessary to remove trees that have been blown across the stream in heavy gales. To this end I have provided my machine with a saw 26, by means of which all of these obstructions may be removed. The arbor of this saw is mounted in a swinging arm 27, journaled upon a shaft 28, which shaft is journaled in stud-bearings 29, secured to the frame, and is provided with a sprocket-wheel 30, which is connected by a chain 31 with a sprocket-wheel 32 on the drive-shaft. The upper and lower ends of the swinging arm are provided with slots or recesses 33, the lower one to receive the sprocket-wheel 34, fixed to the arbor of the saw, and the upper one to receive a sprocket-wheel 35, fixed to the shaft 28, these two sprocket-wheels being connected by a sprocket-chain 36.

37 denotes one member of a clutch, which is keyed to the shaft 28 to rotate therewith and to slide thereon, and 38 denotes the other member of the clutch, which is formed on the hub of the sprocket-wheel in the upper end of the swinging arm.

39 denotes a clutch-shipper which is pivoted to the frame and engages the clutch member 37 and by means of which the upper sprocket-wheel carried by the swinging arm may be locked to the shaft and the motion of said shaft imparted to the saw at the lower end of the log.

40 denotes a windlass or winding-drum supported upon the deck of the vessel and provided with a cable 41, which extends along and through guides 42, secured to one of the beams, and has at its free ends grapples 43. When it is desired to remove a log from the river, these grapples are engaged therewith and the windlass or drum rotated, so that the log may be raised entirely clear of the bed of the river in which it has been embedded. Should, however, the log be of such dimensions as to render it impracticable or impossible to withdraw it, then the portion projecting free from the bottom of the river and not embedded therein may be cut off by lowering the saw, the swinging arm being provided with a pivoted push-rod 44, by means of which the saw may be forced to its work. When the saw is not in use, it is of course understood that the sliding clutch member is removed from engagement with the clutch member of the sprocket-wheel and the saw elevated from contact with the water.

Having thus described the invention, what I claim, and desire to secure by Letters Patent, is—

In a machine of the character described, the combination with the frame adapted to be pivoted to the bow of a vessel, of cutter-heads 12 fixed to a shaft 11 supported at the forward end of said frame and provided with suitable cutters, a sprocket-wheel 15 fixed to said shaft, a shaft 17 having sprocket-wheels 16 and 19 fixed thereto, a sprocket-chain connecting the wheels 15 and 16, a driving-shaft 22 having a sprocket-wheel 21 fixed thereto, a sprocket-chain 20 connecting the sprocket-wheels 19 and 21, a windlass, a rope connected to the pivoted frame and passing over a pulley 25 secured to the bow of the boat and connected to the windlass, substantially as and for the purpose set forth.

In testimony whereof I have hereunto set my hand in presence of two subscribing witnesses.

JOSEPH ALLEN.

Witnesses:
 JAY NYE,
 G. F. O'BRIEN.